US011125654B2

(12) United States Patent
Sato et al.

(10) Patent No.: US 11,125,654 B2
(45) Date of Patent: Sep. 21, 2021

(54) ABNORMALITY CAUSE IDENTIFYING SYSTEM FOR DEVICE INCLUDING ROTATING MEMBER

(71) Applicant: KAWASAKI JUKOGYO KABUSHIKI KAISHA, Kobe (JP)

(72) Inventors: Eiji Sato, Kobe (JP); Hisao Wada, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 16/627,398

(22) PCT Filed: May 17, 2018

(86) PCT No.: PCT/JP2018/019183
§ 371 (c)(1),
(2) Date: Dec. 30, 2019

(87) PCT Pub. No.: WO2019/003699
PCT Pub. Date: Jan. 3, 2019

(65) Prior Publication Data
US 2021/0088418 A1    Mar. 25, 2021

(30) Foreign Application Priority Data

Jun. 29, 2017   (JP) ............................ JP2017-127421

(51) Int. Cl.
*G06F 11/30* (2006.01)
*G01M 99/00* (2011.01)

(52) U.S. Cl.
CPC .................. *G01M 99/005* (2013.01)

(58) Field of Classification Search
CPC .................................................. G01M 99/005
See application file for complete search history.

(56) References Cited

U.S. PATENT DOCUMENTS 7,168,324 B2 *   1/2007   Boda ...................... G01H 1/003
702/56
2008/0234964 A1   9/2008   Miyasaka et al.

FOREIGN PATENT DOCUMENTS

| JP | 2003-149043 | * | 5/2003 |
| JP | 2003-149043 | A | 5/2003 |
| JP | 3834228 | B2 | 10/2006 |

OTHER PUBLICATIONS

"Vibration Analysis & Diagnostic Systems: infiSYS RV-200~." Shinkawa Sensor Technology, Co., Ltd., pp. 1-10, 2012.
(Continued)

*Primary Examiner* — Phuong Huynh
(74) *Attorney, Agent, or Firm* — Oliff PLC

(57) ABSTRACT

An abnormality cause identifying system for a device including a rotating member includes: acceleration sensors, a pickup sensor, and a temperature sensor, which observe a state of a rotating member and acquire a measurement data piece; a measurement data piece converting portion configured to convert the measurement data piece into two or more new-format conversion data pieces that are different from each other; and an abnormality cause identifying portion configured to identify an abnormality cause of the device by analyzing the conversion data pieces created by the measurement data piece converting portion.

10 Claims, 10 Drawing Sheets

(56) References Cited

OTHER PUBLICATIONS

Jul. 17, 2019 International Search Report issued in International Patent Application No. PCT/JP2018/019183.
Mar. 1, 2021 Extended Search Report issued in European Patent Application No. 18825520.2.
Bilosova, "Vibration Diagnostics", Investments in Education Development, pp. 1-114, Jan. 1, 2012.
Anonymous, "Vibration Analysis & Diagnostics Systems INFISYS RV-200", Oct. 28, 2015, retrieved from <https://web.archive.org/web/20151028193738/https://www.shinkawaelectric.com/en/products/analysis_diagnostics/infisys.html> [retrieved on Feb. 16, 2021].
Ed Wilcox, "Vibration Analysis for Turbomachinery", 45th Turbomachinery and 32nd Pump Symposia, Sep. 12, 2016.
Avinash et al., "Transient Vibration Analysis of Refinery Steam Turbines Using Labview Program", International Journal of Innovative Research in Science, Engineering and Technology, vol. 5, No. 9, pp. 2319-8753, May 1, 2016.
Baguet S. et al., "Nonlinear Couplings in a Gear-Shaft-Bearing System". Mechanism and Machine Theory, vol. 45, No. 12, pp. 1777-1796, Dec. 1, 2010.

* cited by examiner

| ABNORMALITY CAUSES | COMBINATION PATTERNS FOR ANALYSIS | | | | | | | |
|---|---|---|---|---|---|---|---|---|
| | BOARD DATA PIECE | POLAR DATA PIECE | ORBIT DATA PIECE | FREQUENCY ANALYSIS DATA PIECE | WATERFALL DATA PIECE | CASCADE DATA PIECE | CAMBER DATA PIECE | SHAFT CENTER TRACE DATA PIECE |
| NORMAL STATE (UNBALANCE) | 3 | 3 | | | 2 | 1 | 1 | |
| CHIP-OFF/ADHESION IN ROTATING MEMBER | 1 | 3 | | | 2 | 2 | 2 | |
| THERMAL UNBALANCE | 1 | 3 | | | 2 | 1 | 1 | |
| CRACK ON ROTATING SHAFT | | | | 1 | 2 | 3 | 3 | |
| RUBBING | | 2 | 3 | 1 | 2 | 1 | 1 | |
| MISALIGNMENT (COUPLING IS CONNECTED COAXIALLY) | | | | 1 | | 2 | 2 | 3 |
| COUPLING ANGULAR DIFFERENCE | | | | 1 | 2 | 3 | 3 | |
| SHAKY BEARING STAND | | | | 1 | 3 | 2 | 2 | |
| OIL WHIRL | | | 2 | 1 | 2 | 3 | 3 | 3 |
| OIL WHIP | | 2 | 2 | 1 | 2 | 3 | 3 | 3 |
| STEAM WHIRL (STEAM TURBINE) | | | 2 | 1 | 3 | 2 | 2 | 1 |
| GAS WHIRL (COMPRESSOR) | | | 2 | 1 | 3 | 2 | 2 | 1 |
| INTERNAL DAMPING | | | 2 | 1 | 2 | 3 | 3 | |
| GEAR | | | | 3 | 2 | 2 | 2 | |
| ROLLING BEARING | | | | 3 | 2 | 2 | 2 | |

FIG.10

ABNORMALITY CAUSE IDENTIFYING SYSTEM FOR DEVICE INCLUDING ROTATING MEMBER

TECHNICAL FIELD

The present invention relates to an abnormality cause identifying system for a device including a rotating member.

BACKGROUND ART

Conventionally known is a system for identifying an abnormal portion of a device (such as a gas turbine, a compressor, or a robot including an articulated arm) including a rotating member, based on a measurement data piece acquired from a sensor attached to the device. However, there is a demand of identifying not only the abnormal portion but also an abnormality cause in order to improve the device including the rotating member. One example of an abnormality cause identifying system which is used for a device including a rotating member and capable of meeting such demand is an abnormality diagnosing system for a rotating machine disclosed in PTL 1.

The abnormality diagnosing system of PTL 1 includes: a vibration detection sensor provided at the rotating machine that is a diagnosis target; an arithmetic processing unit configured to convert a detection signal, acquired from the vibration detection sensor, to a vibration data piece; and an information processing device configured to perform diagnosis based on the vibration data piece acquired from the arithmetic processing unit.

CITATION LIST

Patent Literature

PTL 1: Japanese Patent No. 3834228

SUMMARY OF INVENTION

Technical Problem

Although not described in PTL 1 in detail, the abnormality diagnosing system for the rotating machine in PTL 1 converts a data piece regarding one type of frequency generated during the operation of the rotating machine to create one conversion data piece and identifies the abnormality cause based on the conversion data piece. However, in this case, the abnormality cause cannot be identified with a high degree of accuracy, and the number of types of abnormality causes identified is small.

An object of the present invention is to provide an abnormality cause identifying system for a device including a rotating member, the abnormality cause identifying system being capable of identifying many types of abnormality causes with a high degree of accuracy.

Solution to Problem

To solve the above problem, an abnormality cause identifying system for a device including a rotating member according to the present invention is an abnormality cause identifying system configured to identify an abnormality cause of a device including a rotating member based on a measurement data piece measured during an operation of the device. The abnormality cause identifying system includes: a sensor configured to observe a state of the rotating member and acquire the measurement data piece; a measurement data piece converting portion configured to convert the measurement data piece into two or more new-format conversion data pieces that are different from each other; and an abnormality cause identifying portion configured to identify the abnormality cause of the device by analyzing the conversion data pieces created by the measurement data piece converting portion.

According to this configuration, the measurement data piece converting portion converts the measurement data piece into two or more new-format conversion data pieces that are different from each other, and the abnormality cause identifying portion identifies the abnormality cause of the device by analyzing these conversion data pieces. With this, the abnormality cause can be identified with a higher degree of accuracy than a conventional case where, for example, a data piece regarding one type of frequency generated during the operation of a rotating machine is converted into one conversion data piece, and the abnormality cause is identified based on this conversion data piece. Further, the number of types of abnormality causes identified can be increased. To be specific, the abnormality cause identifying system for the device including the rotating member according to the present invention can identify many types of abnormality causes with a high degree of accuracy.

The abnormality cause identifying portion may identify the abnormality cause of the device by analyzing, in combination, at least two of the two or more new-format conversion data pieces created by the measurement data piece converting portion.

According to this configuration, the above-described effects of the present invention can be made significant.

The two or more conversion data pieces may include at least two of: a frequency analysis data piece created so as to include a frequency data piece by showing amplitudes at respective frequencies at a specific time point in an orthogonal coordinate system; a waterfall data piece created so as to include a time data piece in addition to a frequency data piece by arranging and showing amplitudes at respective frequencies within a specific time range; a board data piece created so as to include an amplitude data piece and a phase data piece by showing amplitudes and phases at respective rotational frequencies in an orthogonal coordinate system; a polar data piece created so as to include a phase data piece by showing amplitudes and phases at respective time points in a polar coordinate system; an orbit data piece created so as to include vibration data pieces of two directions by showing a vibration trace formed by continuously arranging, within a specific time range, shaft center positions each determined based on the two vibration data pieces of the two directions, the two vibration data pieces being measured at a same time point; a shaft center trace data piece created so as to include a data piece of a shaft center position in a sliding bearing by showing a trace of shaft center positions at respective time points or respective rotational frequencies within a specific time range in a polar coordinate system, the shaft center positions being vibration centers each determined based on the two vibration data pieces of the two directions, the two vibration data pieces being measured at a same time point; a cascade data piece created so as to include a rotational frequency data piece in addition to a frequency data piece by arranging and showing amplitudes at respective frequencies within a specific rotational frequency range; and a camber data piece created so as to include a rotational frequency data piece in addition to a frequency data piece by arranging amplitudes at respective frequencies within a specific rotational frequency range, the camber data piece being shown by a different format from the cascade data piece.

According to this configuration, the abnormality cause identifying portion uses, for example, the frequency analysis data piece or waterfall data piece and the other data piece. With this, the abnormality cause identifying portion can identify the abnormality cause of the device by performing the analysis based on not only the frequency data piece within a specific time range but also the other data piece. Thus, the above-described effects of the present invention can be made significant.

When converting the measurement data piece into the frequency analysis data piece, the waterfall data piece, the board data piece, the cascade data piece, or the camber data piece, the measurement data piece converting portion may perform nondimensionalization by using a feature frequency of each data piece.

According to this configuration, the abnormality cause identifying system for the device including the rotating member according to the present invention can be widely used without depending on the frequencies of respective devices.

When converting the measurement data piece into the frequency analysis data piece, the waterfall data piece, the cascade data piece, or the camber data piece, the measurement data piece converting portion may create two or more nondimensionalization data pieces as each data piece by using two or more types of feature frequencies of each data piece, the two or more types of feature frequencies being different from each other.

According to this configuration, since two or more nondimensionalization data pieces are created from one conversion data piece, the two or more nondimensionalization data pieces can be analyzed in combination. With this, the analysis can be performed after emphasizing the feature that appears due to the abnormality, and therefore, the abnormality cause can be identified with a higher degree of accuracy.

The measurement data piece converting portion may label the nondimensionalization data pieces regarding the types of the feature frequencies used when performing the nondimensionalization.

According to this configuration, even when two or more nondimensionalization data pieces are created from one conversion data piece, the two or more nondimensionalization data pieces can be easily managed. With this, for example, the processing speed when identifying the abnormality cause can be improved.

For example, the abnormality cause identifying portion may perform the analysis by comparison between the conversion data piece created by the measurement data piece converting portion and a previously-created determination model.

The measurement data piece may include a first measurement data piece that is converted into the two or more conversion data pieces by the measurement data piece converting portion and a second measurement data piece that is not converted by the measurement data piece converting portion, and the abnormality cause identifying portion may identify the abnormality cause of the device by adding at least one of the second measurement data piece and a device control command data piece to at least one of the conversion data pieces and performing the analysis, the device control command data piece being a data piece of a control command supplied to the device.

According to this configuration, the abnormality cause which cannot be identified by analyzing the two or more conversion data pieces can be identified. To be specific, according to this configuration, the number of types of abnormality causes identified can be further increased, and the accuracy of the identification can be improved.

The measurement data piece may include a first measurement data piece that is converted into the two or more conversion data pieces by the measurement data piece converting portion and a second measurement data piece that is not converted by the measurement data piece converting portion, and the abnormality cause identifying portion may identify the abnormality cause of the device by further analyzing at least one of the second measurement data piece and a device control command data piece that is a data piece of a control command supplied to the device.

According to this configuration, the abnormality cause which cannot be identified by analyzing the two or more conversion data pieces can be identified. To be specific, according to this configuration, the number of types of abnormality causes identified can be further increased, and the accuracy of the identification can be improved.

Advantageous Effects of Invention

The present invention can provide an abnormality cause identifying system for a device including a rotating member, the abnormality cause identifying system being capable of identifying many types of abnormality causes with a high degree of accuracy.

BRIEF DESCRIPTION OF DRAWINGS

FIG. 10 is a diagram showing one example of a previously-created determination model included in the abnormality cause identifying system for the device including the rotating member according to one embodiment of the present invention.

DESCRIPTION OF EMBODIMENTS

Entire Configuration

Figure 1:
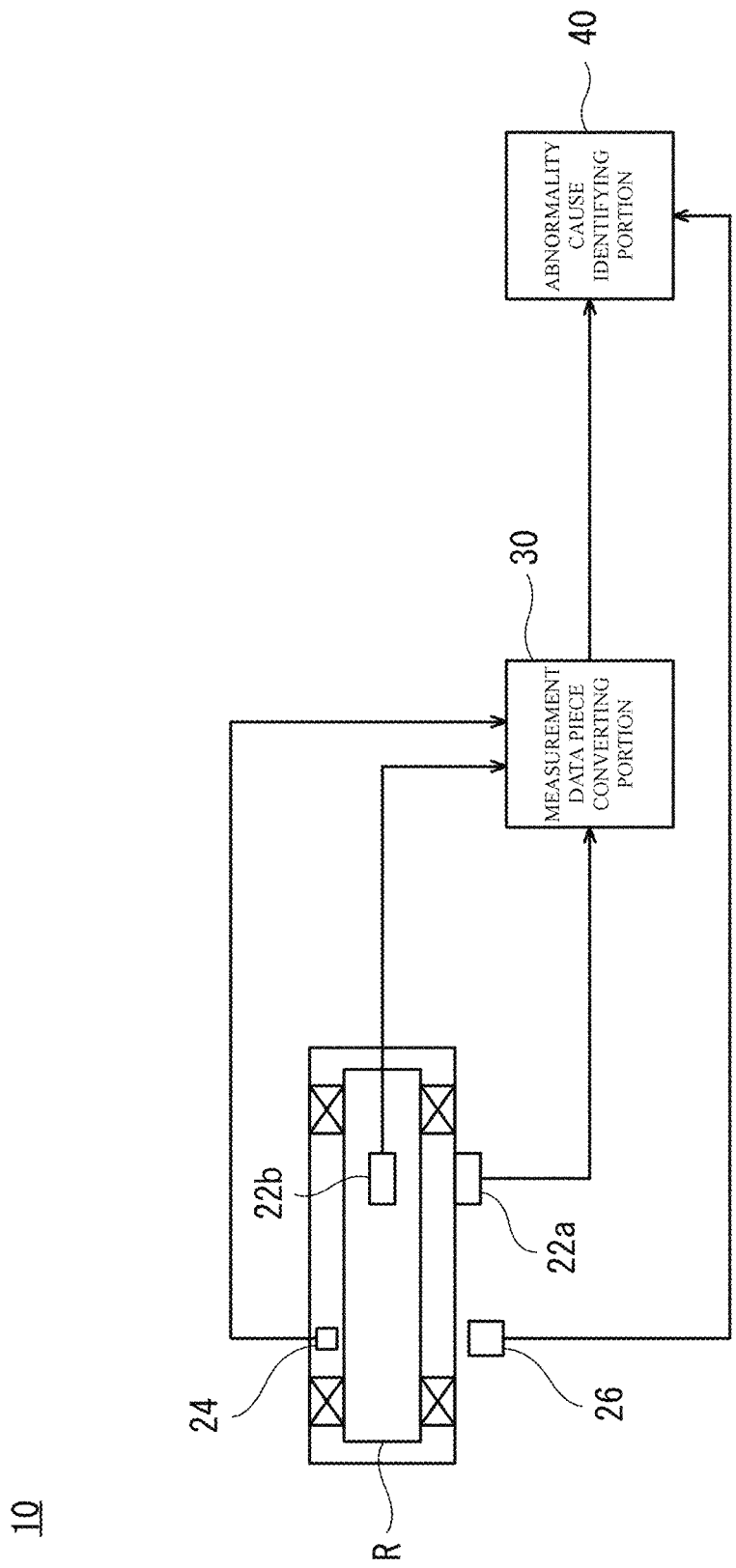
FIG. 1 is a block diagram showing an entire configuration of an abnormality cause identifying system for a device including a rotating member according to one embodiment of the present invention.

Hereinafter, an abnormality cause identifying system for a device including a rotating member according to one embodiment of the present invention will be described with reference to the drawings. FIG. 1 is a block diagram showing an entire configuration of an abnormality cause identifying system for a device including a rotating member according to one embodiment of the present invention.

An abnormality cause identifying system 10 for a device including a rotating member according to one embodiment of the present invention (hereinafter simply referred to as an "abnormality cause identifying system 10") identifies an abnormality cause of a device (such as a gas turbine, a steam turbine, a compressor, a hydraulic pump/motor, an electric motor, or a robot including an articulated arm driven by the action of a rotating unit) including a rotating member R, based on a measurement data piece measured during an operation of the device.

As shown in FIG. 1, the abnormality cause identifying system 10 includes: two acceleration sensors 22a and 22b and a pickup sensor 24 which are provided at the device including the rotating member R; a temperature sensor 26 provided in the vicinity of the device including the rotating member R; a measurement data piece converting portion 30 electrically connected to the two acceleration sensors 22a and 22b and the pickup sensor 24; and an abnormality cause identifying portion 40 electrically connected to the measurement data piece converting portion 30 and the temperature sensor 26.

Acceleration Sensors 22a and 22b and Pickup Sensor 24

Each of the two acceleration sensors 22a and 22b measures a vibration data piece (first measurement data piece) of vibration of the rotating member R, the vibration being generated during the operation of the device. The acceleration sensor 22a measures a vibration data piece of a first direction (X-axis direction) perpendicular to a shaft center direction of the rotating member R. The acceleration sensor 22b measures a vibration data piece of a second direction (Y-axis direction) perpendicular to the shaft center direction of the rotating member R and the first direction. Each of the two acceleration sensors 22a and 22b transmits the measured vibration data piece to the measurement data piece converting portion 30. The pickup sensor 24 measures a rotational frequency (first measurement data piece) of the rotating member R. The pickup sensor 24 transmits the measured rotational frequency to the measurement data piece converting portion 30. It should be noted that in order to measure the vibration data piece, for example, a speed sensor and/or a displacement sensor may be used instead of or in addition to the two acceleration sensors 22a and 22b.

Temperature Sensor 26

The temperature sensor 26 measures a temperature data piece (second measurement data piece). The temperature sensor 26 transmits the measured temperature data piece to the abnormality cause identifying portion 40.

Measurement Data Piece Converting Portion 30

The measurement data piece converting portion 30 converts the vibration data pieces of the two directions acquired by the acceleration sensors 22a and 22b and the rotational frequency acquired by the pickup sensor 24 into two or more new-format conversion data pieces that are different from each other. The measurement data piece converting portion 30 is, for example, a computer and includes memories, such as a ROM and a RAM, and a CPU, and programs stored in the ROM are executed by the CPU.

FIGS. 2 to 8 are diagrams each showing one example of the above new-format conversion data piece created by the measurement data piece converting portion 30. The measurement data piece converting portion 30 transmits the created conversion data pieces to the abnormality cause identifying portion 40. At this time, each conversion data piece may be transmitted as a numerical value data piece, a chart data piece, or an image data piece.

Figure 2:
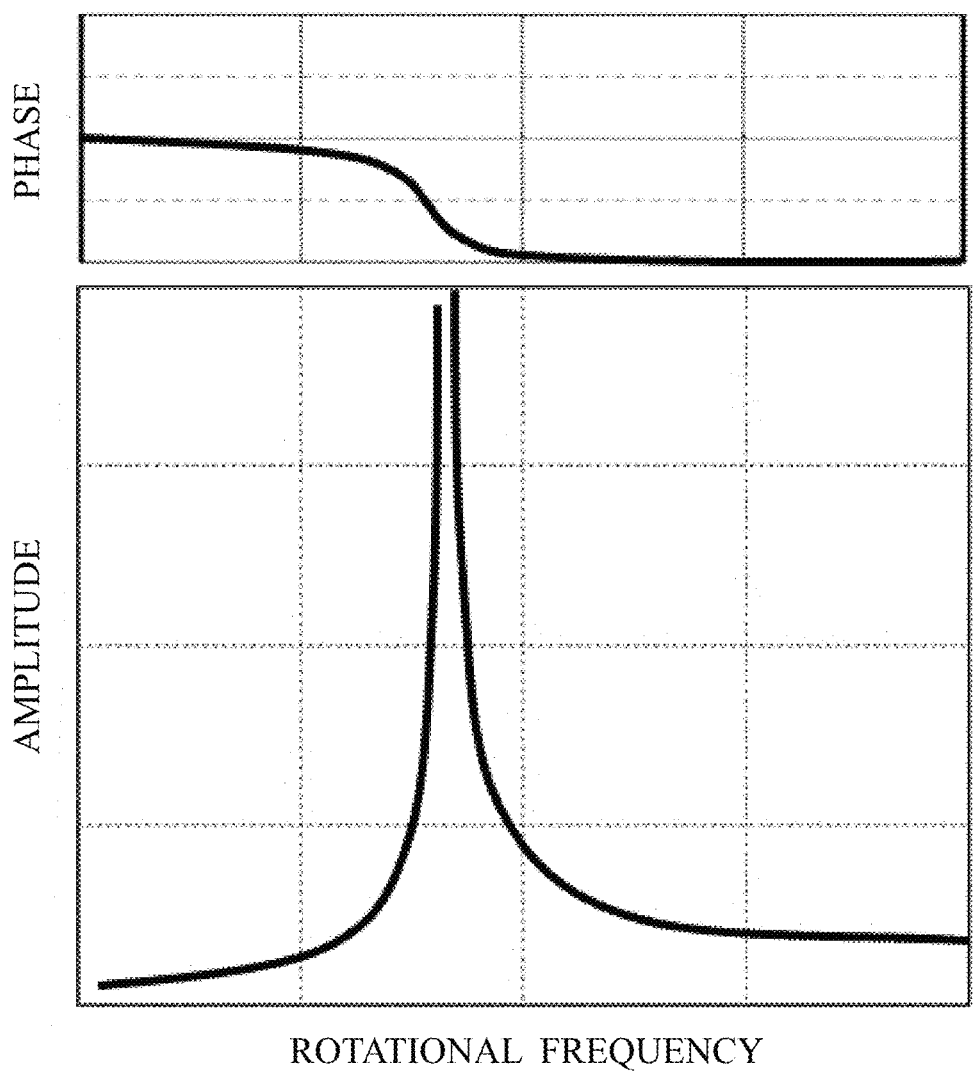
FIG. 2 is a diagram showing one example of a board data piece created by a measurement data piece converting portion included in the abnormality cause identifying system shown in FIG. 1.

FIG. 2 shows one example of a board data piece created so as to include an amplitude data piece and a phase data piece by showing amplitudes and phases at respective rotational frequencies in an orthogonal coordinate system. As shown in FIG. 2, the board data piece is shown by, for example, a combination of a phase chart in which a horizontal axis denotes the rotational frequency, and a vertical axis denotes the phase and a diagram in which a horizontal axis denotes the rotational frequency, and a vertical axis denotes the amplitude. It should be noted that the board data piece may be created for each of: a rotation synchronous component X; (nX) corresponding to extraction of a vibration frequency component obtained by multiplying X by n (n is an integer of 2 or more or −1); and ((1/n)X) corresponding to extraction of a vibration frequency component obtained by multiplying X by 1/n (n is an integer of 2 or more). Further, if the rotating member R is provided with blades, the number of blades is represented by z, or if the rotating member R is provided with gears, the number of gears is represented by z. Then, zX is obtained by multiplying the rotation synchronous component X by the number z. In this case, the board data piece may be created for each of: (nzX) corresponding to a vibration frequency component obtained by multiplying zX by n (n is an integer of 1 or more); ((1/n)zX) corresponding to a vibration frequency component obtained by multiplying zX by 1/n (n is an integer of 2 or more); (zX+nX) (n is an integer of 1 or more) corresponding to the addition of the rotation synchronous component X to zX; and (zX−nX) (n is an integer of 1 or more) corresponding to the subtraction of the rotation synchronous component X from zX. It should be noted that an unbalance vibration component described below is synonymous with the rotation synchronous component. Further, a critical speed is made clear by the board data piece.

Figure 3:
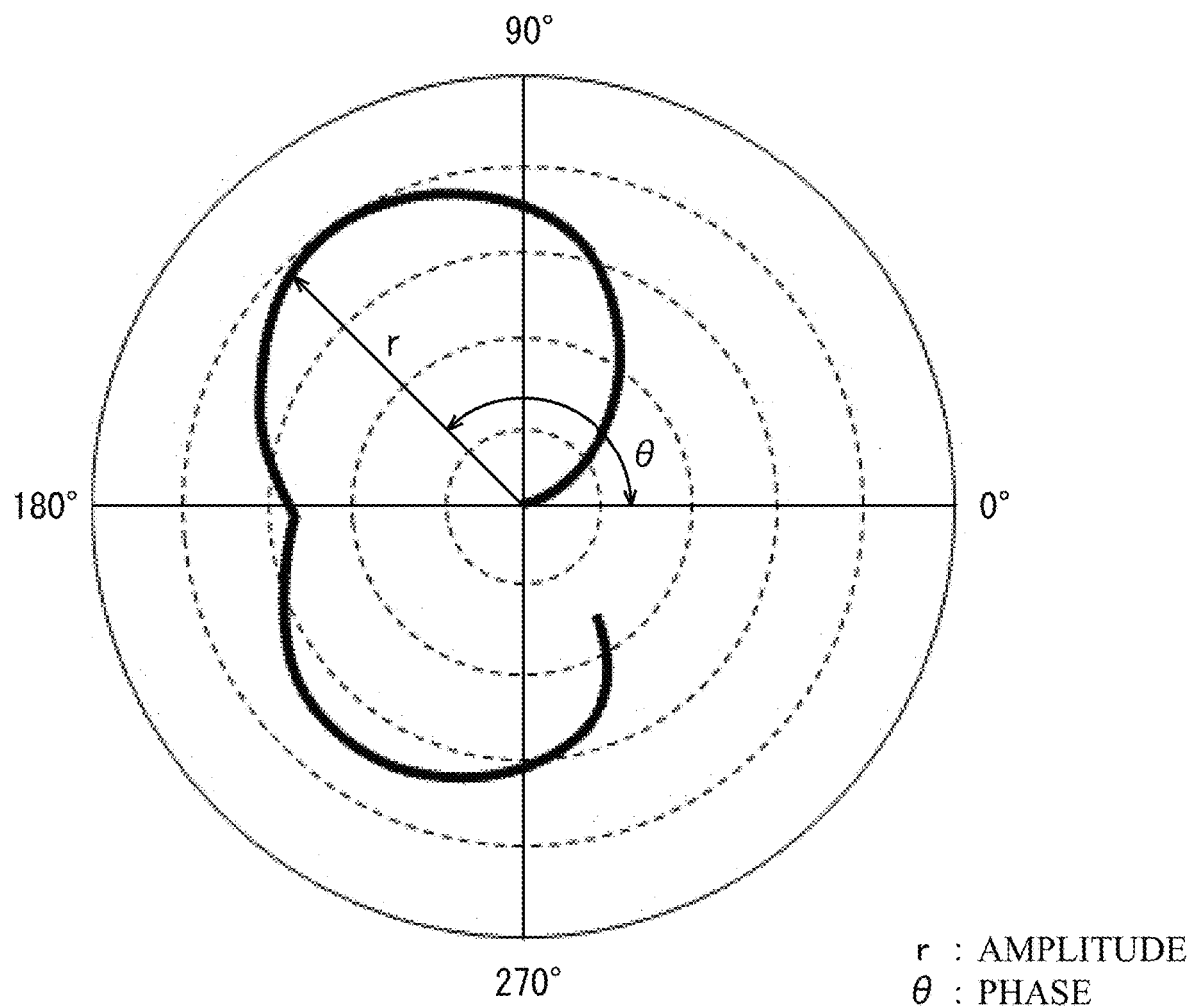
FIG. 3 is a diagram showing one example of a polar data piece created by the measurement data piece converting portion included in the abnormality cause identifying system.

FIG. 3 shows one example of a polar data piece created so as to include a phase data piece by showing amplitudes and phases at respective time points in a polar coordinate system. As shown in FIG. 3, the polar data piece is shown as, for example, a chart in which gridlines of concentric circles denote the amplitudes, and radial gridlines denote the phases. The polar data piece shows a trace of a vibration vector and shows the phase and amplitude of an unbalance vibration component (1X). Therefore, when abnormality occurs in relation to the unbalance vibration, a feature of the abnormality tends to appear in the polar data piece. Especially, when the phase changes, the feature appears significantly in the polar data piece.

Figure 4:
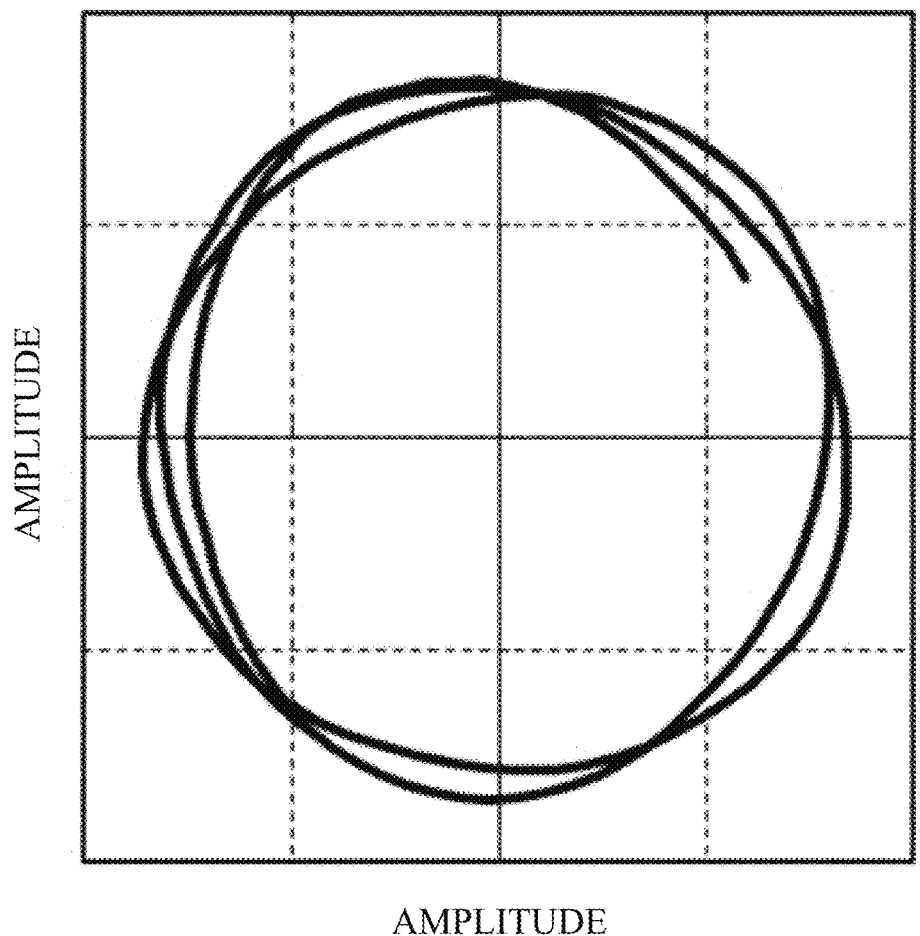
FIG. 4 is a diagram showing one example of an orbit data piece created by the measurement data piece converting portion included in the abnormality cause identifying system.

FIG. 4 shows one example of an orbit data piece created so as to include the vibration data pieces of the two directions by showing a vibration trace formed by continuously arranging, within a specific time range, shaft center positions each determined based on the two vibration data pieces of the two directions, the two vibration data pieces being measured at the same time point. As shown in FIG. 4, the orbit data piece is shown as, for example, a chart prepared by continuously arranging instantaneous values of the shaft center positions in an orthogonal coordinate system in which a horizontal axis and a vertical axis denote amplitudes. In the orbit data piece, a circular shape (or an oval shape) largely changes when the force of a vector different from an unbalance (centrifugal force), such as reaction force by contact, is generated. Therefore, the feature of the abnormality tends to appear in the orbit data piece when a nonlinear phenomenon, such as contact, occurs.

Figure 5:
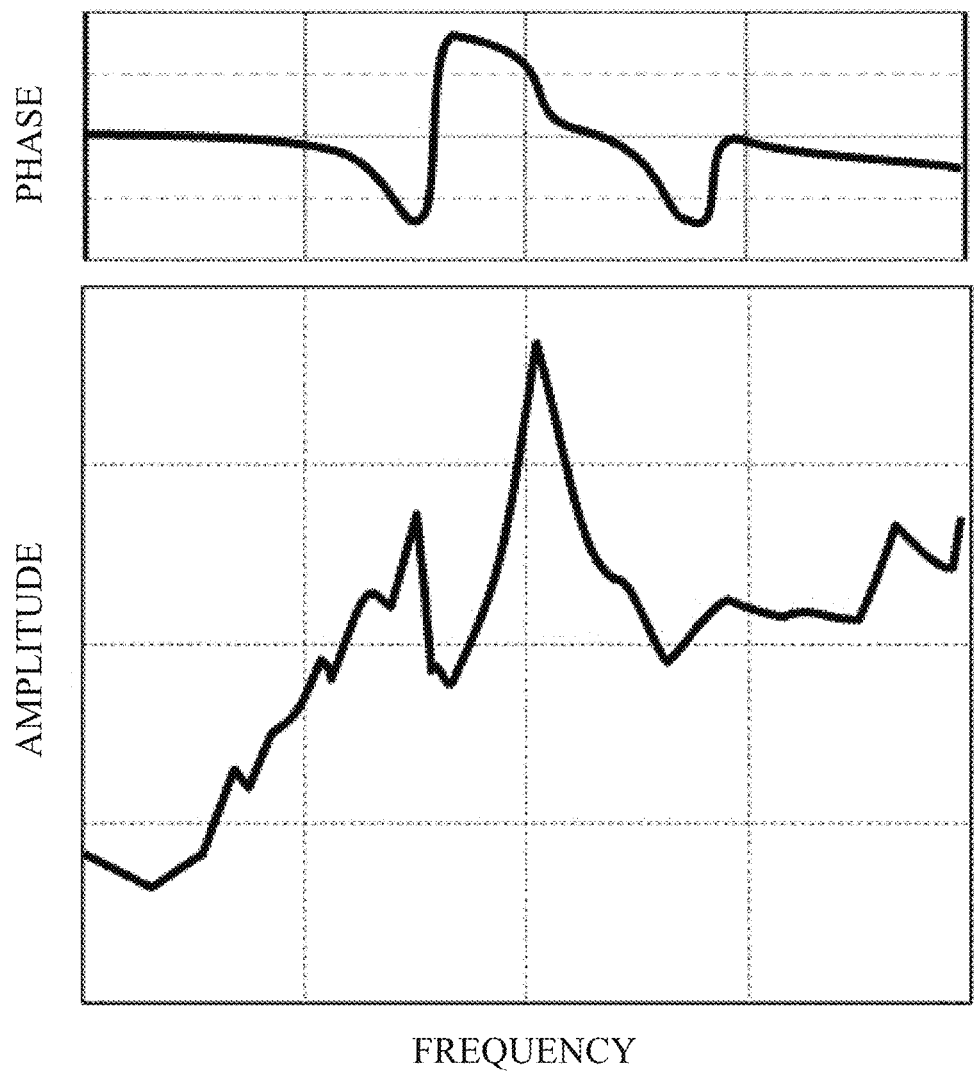
FIG. 5 is a diagram showing one example of a frequency analysis data piece created by the measurement data piece converting portion included in the abnormality cause identifying system.

FIG. 5 shows one example of a frequency analysis data piece created so as to include a frequency data piece by showing amplitudes at respective frequencies at a specific time point in an orthogonal coordinate system. As shown in FIG. 5, the frequency analysis data piece is shown as a chart (a chart in which a horizontal axis denotes a frequency, and a vertical axis denotes a phase and a chart in which a horizontal axis denotes a frequency, and a vertical axis denotes an amplitude) regarding two frequencies obtained by fast Fourier transform of the vibration data pieces, for example. The characteristics of the frequency within a specific time range can be recognized by the frequency analysis data piece. It should be noted that since a change in an unbalance component indicating abnormality tends to appear at a frequency, such as the critical speed, the frequency analysis data piece may be created after nondimensionalization by such feature frequency.

Figure 6:
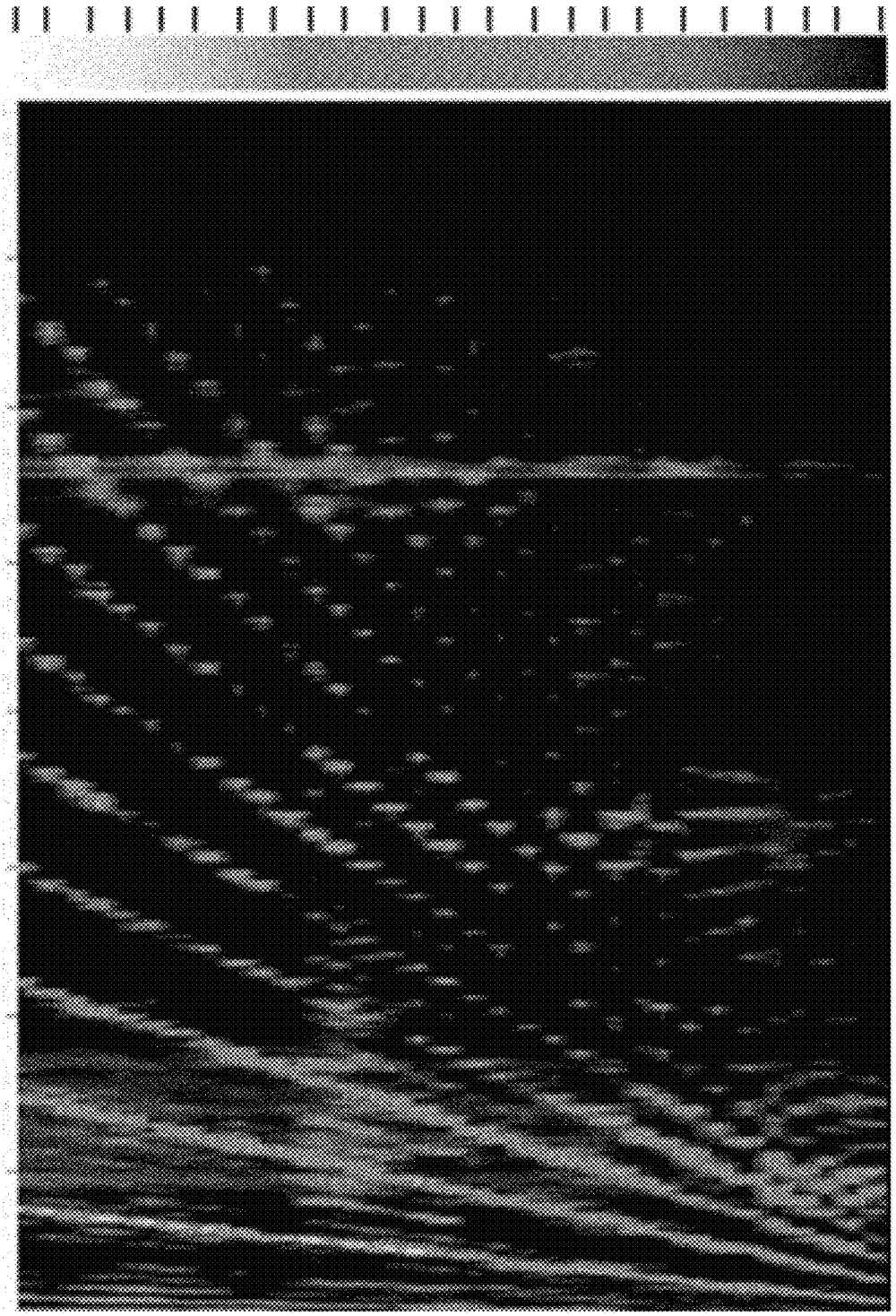
FIG. 6 is a diagram showing one example of a waterfall data piece created by the measurement data piece converting portion included in the abnormality cause identifying system.

FIG. 6 shows one example of a waterfall data piece created so as to include a time data piece in addition to a frequency data piece by arranging and showing amplitudes at respective frequencies within a specific time range. As shown in FIG. 6, the waterfall data piece is shown as, for example, a color shade map in which a horizontal axis denotes a frequency, a vertical axis denotes a time, and a color (or a shade) denotes an amplitude. The time data piece in addition to the frequency data piece can be shown by one conversion data piece. Therefore, when abnormality occurs, a temporal change of the abnormality tends to appear in the waterfall data piece. When abnormality occurs in the device itself, the feature of the abnormality appears in the waterfall data piece so as to increase periodically or gradually. On the other hand, when abnormality occurs due to noise, disturbance, etc., the feature of the abnormality temporarily appears in the waterfall data piece, and it also appears in the waterfall data piece during the stop of the device and during a low-speed operation of the device. Therefore, according to the waterfall data piece having the above actions, when abnormality occurs due to noise, disturbance, etc., the sign of the abnormality can be recognized by a temporal change. Further, by performing the nondimensionalization by the rotational frequency, the feature of the abnormality tends to appear in the waterfall data piece when abnormality occurs due to meshing of gears or a bearing or when the nonlinear phenomenon occurs. Then, by performing the nondimensionalization by a natural frequency, the feature of the abnormality tends to appear in the waterfall data piece when unstable vibrations occur.

Figure 7:
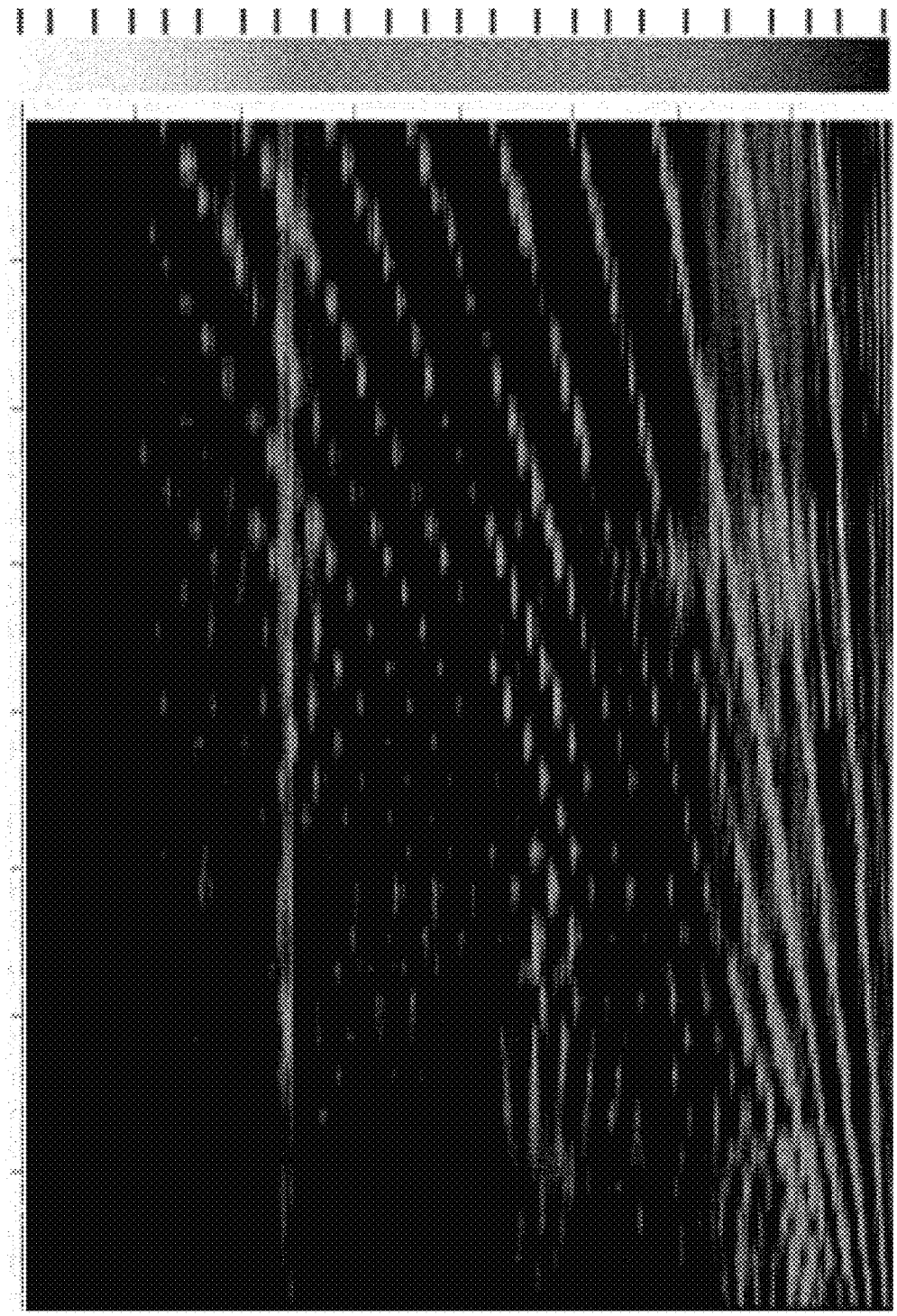
FIG. 7 is a diagram showing one example of a cascade data piece created by the measurement data piece converting portion included in the abnormality cause identifying system.

FIG. 7 shows one example of a cascade data piece created so as to include a rotational frequency data piece in addition to a frequency data piece by arranging and showing amplitudes at respective frequencies within a specific rotational frequency range. As shown in FIG. 7, the cascade data piece is shown as, for example, a color shade map in which a horizontal axis denotes a frequency, a vertical axis denotes a rotational frequency, and a color (or a shade) denotes an amplitude. According to the cascade data piece, state changes at respective rotational frequencies can be recognized. Further, the natural frequency and the critical speed are made clear by the cascade data piece.

Figure 8:
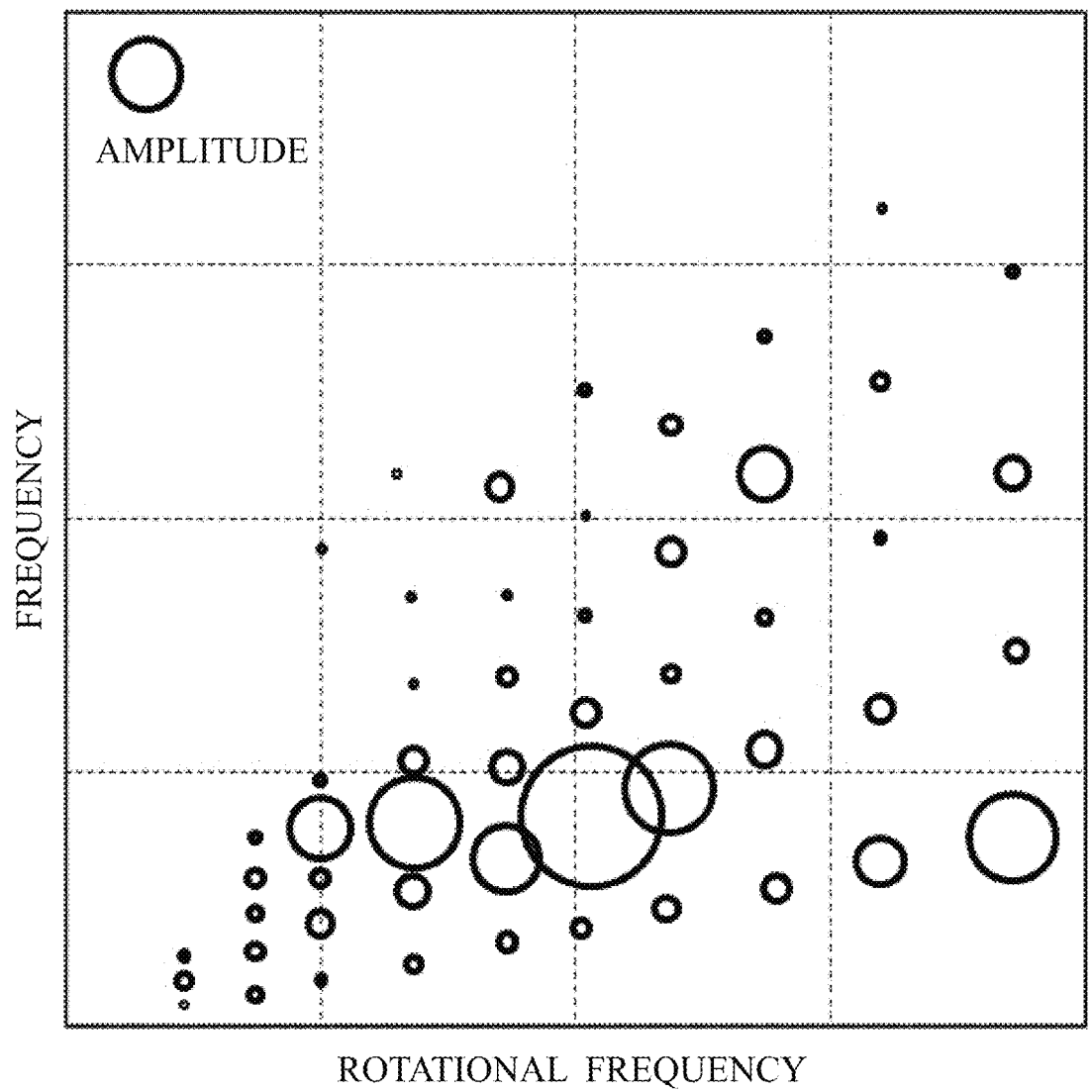
FIG. 8 is a diagram showing one example of a camber data piece created by the measurement data piece converting portion included in the abnormality cause identifying system.

FIG. 8 shows one example of the camber data piece created so as to include a rotational frequency data piece in addition to a frequency data piece by arranging amplitudes at respective frequencies within a specific rotational frequency range, the camber data piece being shown by a different format from the cascade data piece. As shown in FIG. 8, the camber data piece is shown as, for example, a chart in which a horizontal axis denotes a rotational frequency, a vertical axis denotes a frequency, and absolute values of amplitudes are shown by circles. It should be noted that the camber data piece shows the same contents as the cascade data piece by a different format from the cascade data piece. Therefore, the use and the like of the camber data piece are the same as those of the cascade data piece, and therefore, explanations thereof are omitted.

Figure 9:
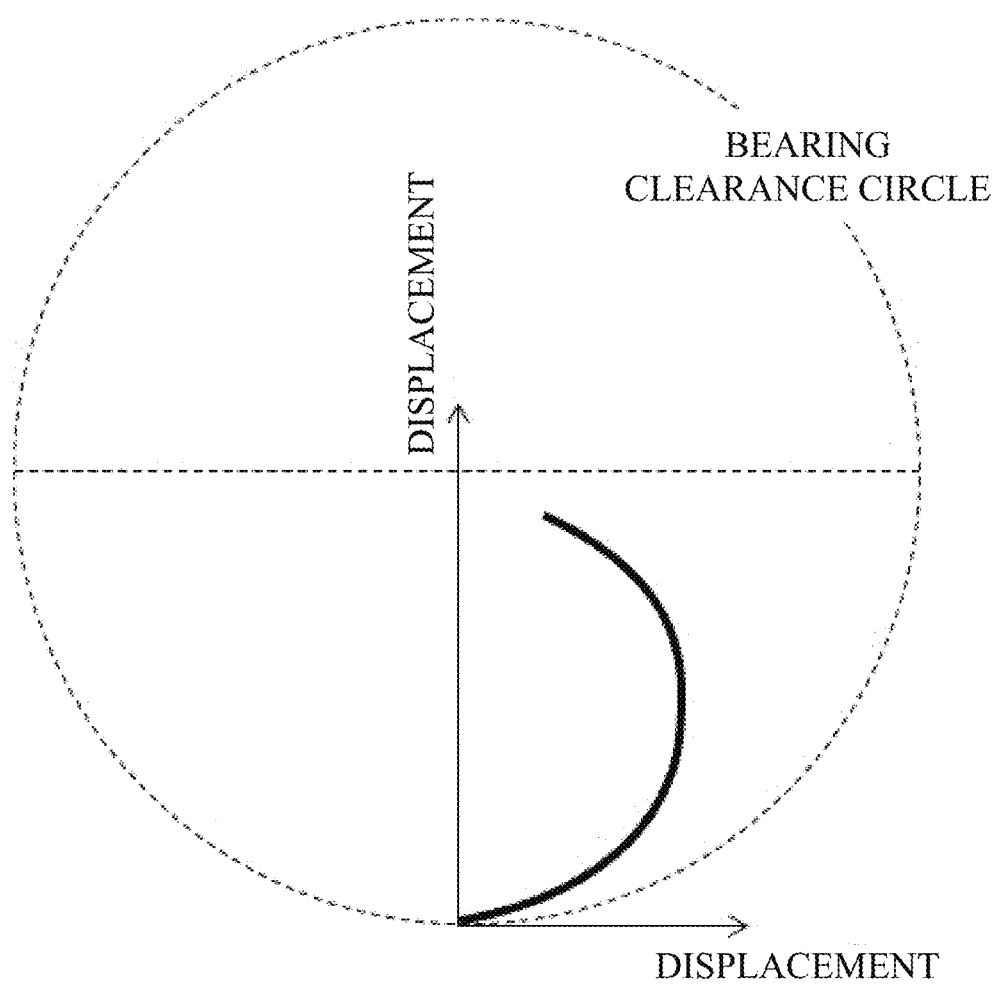
FIG. 9 is diagram showing one example of a shaft center trace data piece created by the measurement data piece converting portion included in the abnormality cause identifying system.

FIG. 9 shows one example of a shaft center trace data piece created so as to include a data piece of a shaft center position in a sliding bearing by showing a trace of shaft center positions at respective time points or respective rotational frequencies within a specific time range in a polar coordinate system, the shaft center positions being vibration centers each determined based on the two vibration data pieces of the two directions, the two vibration data pieces being measured at a same time point. As shown in FIG. 9, the shaft center trace data piece is shown as, for example, a chart in which a horizontal axis denotes a shaft center position in a horizontal direction in the sliding bearing, and a vertical axis denotes a shaft center position in a vertical direction in the sliding bearing. When abnormality occurs in the sliding bearing, the feature of the abnormality tends to appear in the shaft center trace data piece. The route of floating of a shaft in the sliding bearing, such as a linearly rising trace in a tilting pad bearing, is being determined depending on the rotational frequency. Therefore, whether or not the abnormality is occurring can be identified by comparison with this route.

The measurement data piece converting portion 30 converts the vibration data pieces and rotational frequency, measured during the operation of the device, into at least two of the board data piece shown in FIG. 2, the polar data piece shown in FIG. 3, the orbit data piece shown in FIG. 4, the frequency analysis data piece shown in FIG. 5, the waterfall data piece shown in FIG. 6, the shaft center trace data piece shown in FIG. 9, the cascade data piece shown in FIG. 7, and the camber data piece shown in FIG. 8.

It should be noted that when the sliding bearing does not exist in the device, the conversion into the shaft center trace data piece is unnecessary. By not performing such unnecessary conversion, the processing speed of the measurement data piece converting portion 30 can be improved.

When converting into the frequency analysis data piece, the waterfall data piece, the board data piece, the cascade data piece, or the camber data piece, the measurement data piece converting portion 30 may perform the nondimensionalization by using the feature frequency of each data piece. When performing the nondimensionalization of the frequency analysis data piece, the waterfall data piece, the board data piece, the cascade data piece, or the camber data piece, one nondimensionalization data piece may be created as each data piece by using one type of feature frequency.

However, two or more nondimensionalization data pieces may be created as each data piece by using two or more types of feature frequencies that are different from each other.

Examples of the feature frequency used when performing the nondimensionalization of the frequency analysis data piece, the waterfall data piece, the cascade data piece, or the camber data piece include the natural frequency and the critical speed. When a gears is provided at the rotating member R, examples of the feature frequency used when performing the nondimensionalization may include a gear meshing frequency. Further, when the rotating member R is supported by a rolling bearing, examples of the feature frequency used when performing the nondimensionalization may include at least one of a bearing inner ring defect path, a bearing outer ring defect path, a bearing rolling element defect path, and a bearing holder defect path. Furthermore, when a blade is provided at the rotating member R, examples of the feature frequency used when performing the nondimensionalization may include a blade passing frequency. One example of the feature frequency used when performing the nondimensionalization of the board data piece is the critical speed.

When a gear does not exist in the device, the nondimensionalization by using the gear meshing frequency is not performed. Similarly, when the rolling bearing and the sliding bearing do not exist in the device, the nondimensionalization by using the bearing inner ring defect path, the bearing outer ring defect path, the bearing rolling element defect path, and the bearing holder defect path is not performed. When the blade does not exist in the device, the nondimensionalization by using the blade passing frequency is not performed. By not performing such unnecessary nondimensionalization, the processing speed of the measurement data piece converting portion 30 can be improved.

When performing the nondimensionalization as described above, the measurement data piece converting portion 30 may label the nondimensionalization data pieces regarding the types of the feature frequencies used when performing the nondimensionalization.

Abnormality Cause Identifying Portion 40

The abnormality cause identifying portion 40 identifies the abnormality cause of the device by analyzing the conversion data pieces created by the measurement data piece converting portion 30. As with the measurement data piece converting portion 30, the abnormality cause identifying portion 40 includes memories, such as a ROM and a RAM, and a CPU, and programs stored in the ROM are executed by the CPU. It should be noted that the abnormality cause identifying portion 40 may be configured as a computer system (so-called artificial intelligence (AI)) having a self-learning function for artificially realizing intellectual functions, such as reasoning and judging.

The abnormality cause identifying portion 40 may analyze, in combination, at least two of the two or more conversion data pieces created by the measurement data piece converting portion 30 as shown in FIGS. 2 to 9.

The abnormality cause identifying portion 40 may perform the analysis by comparison between the conversion data piece created by the measurement data piece converting portion 30 as shown in FIGS. 2 to 9, for example, and a previously-created determination model. Therefore, in order to store the previously-created determination model, the abnormality cause identifying portion 40 may include a memory apparatus provided separately from the above memories.

FIG. 10 is a diagram showing one example of the previously-created determination model included in the abnormality cause identifying system for the device including the rotating member according to one embodiment of the present invention. In FIG. 10, the abnormality causes are shown at a leftmost column, and combination patterns of the conversion data pieces used to identify whether or not each of the abnormality causes is occurring are shown. In FIG. 10, typical twelve abnormality causes are shown. However, needless to say, the abnormality causes are not limited to these.

In FIG. 10, "3" is shown for the conversion data piece in which the feature of the abnormality cause that is occurring appears significantly. Further, "2" is shown for the conversion data piece in which the feature of the abnormality cause that is occurring appears but is inferior to the feature in the conversion data piece shown by "3". Furthermore, "1" is shown for the conversion data piece in which the feature of the abnormality cause that is occurring does not necessarily appear but which may facilitate the analysis. Therefore, by analyzing the conversion data pieces shown by "3", the abnormality cause can be identified or narrowed. By analyzing two or more conversion data pieces shown by "3" in combination, the abnormality cause can be identified or narrow with a higher degree of accuracy than when one conversion data piece shown by "3" is analyzed. Further, by analyzing only the conversion data piece shown by "2", the abnormality cause can be identified or narrowed. However, by analyzing the conversion data piece shown by "2" and at least one conversion data piece shown by "3", the abnormality cause can be identified or narrowed with a higher degree of accuracy. It should be noted that the abnormality cause identifying portion 40 may analyze at least two of the conversion data piece shown by "3", the conversion data piece shown by "2", and the conversion data piece shown by "1" in combination.

The abnormality causes shown in FIG. 10 will be described below. It should be noted that FIG. 10 also shows the combination pattern of the analysis for identifying that the device is in a normal state. When the device is in a normal state, as shown in FIG. 10, this can be identified by analyzing at least one of the board data piece and the polar data piece. The abnormality cause identifying portion 40 analyzes such conversion data piece, and when the amplitude of the vibration data piece is smaller than a predetermined value, and the phase is reversed at a rotational frequency close to the critical speed, the abnormality cause identifying portion 40 identifies that the device is in a normal state. Further, by adding the waterfall data piece to this analysis, the accuracy of the analysis can be improved. Furthermore, by adding the cascade data piece or the camber data piece to this analysis, the analysis may be facilitated.

When the abnormality occurs due to chip-off of the rotating member R or adhesion of a matter to the rotating member R (in FIG. 10, "Chip-off/Adhesion in Rotating Member"), as shown in FIG. 10, the abnormality cause can be narrowed by analyzing the polar data piece. This is because when the abnormality occurs due to the above cause, the magnitude and position of the unbalance change, and therefore, the phase of the vibration of the unbalance component (1X) of the rotation synchronization changes in addition to the amplitude of the vibration of the unbalance component (1X) of the rotation synchronization, and this phase change tends to appear in the polar data piece ("3"). It should be noted that when the chip-off of the rotating member R occurs, the phase and the amplitude change steeply, and when a matter adheres to the rotating member R, the phase and the amplitude gradually change for a long period of time. Further, by adding the waterfall data piece and the cascade data piece or camber data piece to this analysis, it can be confirmed that the vibration that is occurring is the unbalance component (1X), and therefore, the unbalance component (1X) can be identified. Furthermore, by adding the board data piece to this analysis, the analysis may be facilitated.

When the abnormality occurs due to thermal unbalance of the rotating member R, as shown in FIG. 10, the abnormality cause can be narrowed by analyzing the polar data piece. This is because the thermal unbalance is caused by rubbing, and especially the phase of the unbalance by thermal distortion changes with time so as to continuously draw circles, and this phase change tends to appear in the polar data piece ("3"). Further, by adding the waterfall data piece to this analysis, a temporal change of the unbalance component (1X) can be recognized, and therefore, the unbalance component (1X) can be identified. Furthermore, by adding the board data piece and the cascade data piece or camber data piece to this analysis, the analysis may be facilitated.

When the abnormality occurs due to the generation of a crack on the rotating shaft, as shown in FIG. 10, the abnormality cause can be identified by analyzing the cascade data piece or the camber data piece. This is because: rigidity of the rotating shaft differs between when the crack opens and when the crack closes, and therefore, vibration (2X) that is twice the rotation synchronous component is generated; since the crack is generated during manufacturing or assembling in some cases, and vibrations occur at the time of the start-up in many cases, the feature of the abnormality tends to appear in the cascade data piece ("3") and the camber data piece ("3") each containing the rotational frequency information in addition to the frequency information. Further, when the crack expands with time, the waterfall data piece containing the time information in addition to the frequency information is added to this analysis, and this can improve the accuracy of the analysis. Furthermore, by adding the frequency analysis data piece to this analysis, the analysis may be facilitated.

When the abnormality occurs due to the rubbing of the rotating member R, as shown in FIG. 10, the abnormality cause can be narrowed by analyzing the orbit data piece. This is because when the abnormality occurs due to the above cause, intermittent external force by contact acts on a rotor, and the shape of whirling of the unbalance component (1X) changes so as to be disturbed significantly, and this change in the shape of the whirling vibration tends to appear in the orbit data piece ("3"). By adding at least one of the polar data piece and the waterfall data piece to this analysis, the abnormality cause can be identified. This is because, for example, when friction whip is confirmed based on the waterfall data piece, the feature of the abnormality appears at the vibration frequency component (−1X) that is −1 time the rotation synchronous component X. Further, by adding the frequency analysis data piece to this analysis, the analysis may be facilitated.

When a coupling member is coaxially connected to the rotating member R, but the abnormality occurs due to misalignment of the sliding bearing (in FIG. 10, "Misalignment (Coupling is connected coaxially)"), the position of the shaft center in the bearing moves to a float position or sink position relative to a normal position, and therefore, the characteristics of the bearing change, and this causes abnormal vibrations. As shown in FIG. 10, the abnormality of the position of the shaft center can be narrowed by analyzing the shaft center trace data piece ("3"). Further, by adding the cascade data piece or the camber data piece to this analysis, the abnormality cause can be identified. Furthermore, by adding the frequency analysis data piece to this analysis, the analysis may be facilitated.

When the abnormality occurs due to an angular difference between the coupling member and the rotating member R (in FIG. 10, "Coupling Angular Difference"), as shown in FIG. 10, the abnormality cause can be narrowed by analyzing the cascade data piece or the camber data piece. This is because: since the above cause occurs from an initial stage of the operation of the device, the feature of the cause does not change with time; and by analyzing the cascade data piece or the camber data piece, the abnormality cause can be determined based on whether or not the component (2X) that is twice the unbalance component is generated even when the rotational frequency is changed. Further, by adding the waterfall data piece to this analysis, the abnormality cause can be identified. Furthermore, by adding the frequency analysis data piece to this analysis, the analysis may be facilitated.

When the abnormality occurs because a bearing stand is out of balance and shaky (in FIG. 10, "Shaky Bearing Stand"), as shown in FIG. 10, the abnormality cause can be narrowed by analyzing the waterfall data piece. This is because: since supporting stiffness of the bearing stand becomes nonlinear, harmonic oscillation occurs; and therefore, when the load or the rotational frequency increases, the influence of the shake becomes significant and changes with time; and this change tends to appear in the waterfall data piece ("3"). Further, by adding the cascade data piece or the camber data piece to this analysis, the abnormality cause can be identified. Furthermore, by adding the frequency analysis data piece to this analysis, the analysis may be facilitated.

When the abnormality occurs due to oil whirl of the rotating member R supported by the sliding bearing, a vibration component (($\frac{1}{2}$)X) that is half the rotation synchronization appears at the rotational frequency immediately before the occurrence of oil whip, and the component ($\frac{1}{2}$)X approaches a natural frequency (fn) together with an increase in the rotational frequency. Therefore, as shown in FIG. 10, the abnormality cause can be narrowed by analyzing at least one of the cascade data piece ("3") and the camber data piece ("3"), each of which contains the rotational frequency information and the frequency information. Further, since the abnormality occurs due to the abnormality of the sliding bearing, the change tends to appear also in the shaft center trace data piece ("3"). Therefore, the abnormality cause can be identified by also analyzing the shaft center trace data piece ("3"). Further, by adding at least one of the orbit data piece and the waterfall data piece to this analysis, the accuracy of the analysis can be improved. Furthermore, by adding the frequency analysis data piece to this analysis, the analysis may be facilitated.

When the abnormality occurs due to the oil whip of the rotating member R supported by the sliding bearing, the vibration of the natural frequency (fn) occurs at a rotational frequency that is not less than twice the frequency of the natural frequency (fn) of the lowest order. Therefore, as shown in FIG. 10, the abnormality cause can be narrowed by analyzing at least one of the cascade data piece ("3") and the camber data piece ("3"), each of which contains the rotational frequency information and the frequency information. Further, since the abnormality occurs due to the abnormality of the sliding bearing, the change tends to appear also in the shaft center trace data piece ("3"). Therefore, the abnormality cause can be identified by also analyzing the shaft center trace data piece ("3"). Further, by adding at least one of the polar data piece, the orbit data piece, and the waterfall data piece to this analysis, the accuracy of the analysis can be improved. Furthermore, by adding the frequency analysis data piece to this analysis, the analysis may be facilitated.

When the device including the rotating member R is a steam turbine, and the abnormality occurs due to steam whirl, as shown in FIG. 10, the abnormality cause can be narrowed by analyzing the waterfall data piece. This is because forward whirling occurs at a turbine rotor, and self-excited vibration (fn) occurs due to the fluid force of the steam. Further, by adding at least one of the orbit data piece, the cascade data piece, and the camber data piece to this analysis, the abnormality cause can be identified. Furthermore, by adding at least one of the frequency analysis data piece and the shaft center trace data piece to this analysis, the analysis may be facilitated.

When the device including the rotating member R is a compressor, and the abnormality occurs due to gas whirl, as shown in FIG. 10, the abnormality cause can be narrowed by analyzing the waterfall data piece. This is because the self-excited vibration (fn) occurs due to the fluid force of the operating fluid, and backward whirling occurs in an axial compressor. Further, by adding at least one of the orbit data piece, the cascade data piece, and the camber data piece to this analysis, the abnormality cause can be identified. Furthermore, by adding at least one of the frequency analysis data piece and the shaft center trace data piece to this analysis, the analysis may be facilitated.

When the coupling member and the rotating member R are fitted to each other by friction, and the abnormality occurs due to damping caused by the fitting, the vibration of the natural frequency (fn) occurs at a rotational frequency equal to or more than the critical speed (fc). Therefore, as shown in FIG. 10, the abnormality cause can be narrowed by analyzing the cascade data piece ("3") or the camber data piece ("3"), each of which contains the rotational frequency information and the frequency information. This is because the above cause is generated by the self-excited vibration (fn) caused by the frictional force generated between the shaft and a fitting member, and the above cause occurs at more than the critical speed (fc). Further, by adding at least one of the orbit data piece and the waterfall data piece to this analysis, the abnormality cause can be identified. Furthermore, by adding the frequency analysis data piece to this analysis, the analysis may be facilitated.

When the abnormality occurs at a gear, the measurement data piece is subjected to envelope processing. Then, by analyzing the frequency analysis data piece by using the obtained data piece as shown in FIG. 10, the abnormality cause can be narrowed. Further, by adding at least one of the waterfall data piece, the cascade data piece, and the camber data piece to this analysis, the abnormality cause can be identified. This is because: typically, the meshing frequency that is the feature frequency of the abnormal gear, its higher-order component, and these sideband components slowly change from a normal time; and therefore, the abnormality cause can be identified by confirming the change by the time or the rotational frequency in addition to the frequency analysis data piece at a specific time.

When the abnormality occurs at the rolling bearing, the measurement data piece is subjected to the envelope processing. Then, by analyzing the frequency analysis data piece by using the obtained data piece as shown in FIG. 10, the abnormality cause can be narrowed. Further, by adding at least one of the waterfall data piece, the cascade data piece, and the camber data piece to this analysis, the abnormality cause can be identified. This is because: for example, when a foreign matter gets into the rolling bearing, a steep change appears in any of the bearing inner ring defect path, the bearing outer ring defect path, the bearing rolling element defect path, the bearing holder defect path, and higher-order components of these, each of which is the feature frequency; and therefore, the abnormality cause can be identified by confirming the change by the time or the rotational frequency in addition to the frequency analysis data piece at a specific time.

The abnormality cause identifying portion 40 identifies the abnormality cause of the device as described above and may output the result to an output device (not shown), such as a display, or may store the result and set the result such that the result can be confirmed by an arbitrary device (not shown) provided remotely.

Effects

In the abnormality cause identifying system 10 according to the present embodiment, the measurement data piece converting portion 30 converts the measurement data piece into two or more new-format conversion data pieces (for example, the conversion data pieces shown in FIGS. 2 to 9) that are different from each other, and the abnormality cause identifying portion 40 identifies the abnormality cause of the device by analyzing these conversion data pieces. With this, the abnormality cause can be identified with a higher degree of accuracy than a conventional case where, for example, a data piece regarding one type of frequency generated during the operation of a rotating machine is converted into one conversion data piece, and the abnormality cause is identified based on this conversion data piece. Further, the number of types of abnormality causes identified can be increased. To be specific, the abnormality cause identifying system 10 according to the present embodiment can identify many types of abnormality causes with a high degree of accuracy.

The abnormality cause identifying portion 40 analyzes, in combination, at least two of the two or more new-format conversion data pieces that are created by the measurement data piece converting portion 30 and different from each other. With this, the above effects of the present embodiment can be made significant.

Further, the abnormality cause identifying portion 40 analyzes at least two of the conversion data pieces shown in FIGS. 2 to 9, i.e., uses, for example, the frequency analysis data piece or waterfall data piece and the other data piece. With this, the abnormality cause identifying portion 40 can identify the abnormality cause of the device by performing the analysis based on not only the frequency data piece within a specific time range but also the other data piece. Thus, the above-described effects of the present invention can be made significant.

As described above, the measurement data piece converting portion 30 performs the nondimensionalization by using the feature frequencies of the respective data pieces. With this, the abnormality cause identifying system according to the present embodiment can be widely used without depending on the frequencies of respective devices.

As described above, the measurement data piece converting portion 30 creates two or more nondimensionalization data pieces as each data piece by using two or more types of feature frequencies of each data piece, the two or more types of feature frequencies being different from each other. With this, since two or more nondimensionalization data pieces are created from one conversion data piece, the abnormality cause identifying portion 40 can analyze the two or more nondimensionalization data pieces in combination. As a result, the abnormality cause identifying system 10 according to the present embodiment can perform the analysis after emphasizing the feature that appears due to the abnormality, and therefore, can identify the abnormality cause with a higher degree of accuracy.

Further, the measurement data piece converting portion 30 labels the nondimensionalization data pieces. With this, even when two or more nondimensionalization data pieces are created from one conversion data piece, the two or more nondimensionalization data pieces can be easily managed. With this, for example, the processing speed when identifying the abnormality cause can be improved.

Further, the analysis is performed after adding, to one or more conversion data pieces (for example, the waterfall data piece including a time axis), an operation state monitoring data piece (second measurement data piece), such as a temperature data piece, a pressure data piece, or a device output data piece, which is not converted by the measurement data piece converting portion 30. With this, the accuracy of the identification of the abnormality cause can be improved, or the number of types of abnormality causes identified can be increased.

Modified Examples

The above embodiment describes a case where: the two acceleration sensors 22a and 22b and the pickup sensor 24 are provided at the device including the rotating member R; and with this, the vibration data pieces and the rotational frequency are measured as the first measurement data piece. However, the above embodiment is not limited to this. For example, by providing a microphone in the vicinity of the rotating member R, a sound data piece may be measured as the first measurement data piece. Further, by attaching a torque meter to the device including the rotating member R, a torque data piece may be measured as the first measurement data piece. Furthermore, when the device including the rotating member R is motor-driven, a motor current data piece may be measured as the first measurement data piece.

The above embodiment describes a case where the abnormality cause identifying portion 30 performs the analysis by adding, to one or more conversion data pieces, the second measurement data piece (an operation state monitoring data piece, such as a temperature data piece, a pressure data piece, and/or a device output data piece) which is not converted by the measurement data piece converting portion 30. However, the above embodiment is not limited to this. For example, the abnormality cause identifying portion 30 may perform the analysis by adding, to one or more conversion data pieces, a device control command data piece (for example, a data piece of a control command supplied to a robot in order to operate an articulated arm of the robot), the device control command data piece being a data piece of a control command supplied to the device. With this, the abnormality cause system 10 can further increase the number of types of abnormality causes identified. To be specific, the abnormality cause identifying portion 30 may perform the analysis by adding, to one or more conversion data pieces, at least one of the second measurement data piece which is not converted by the measurement data piece converting portion 30 and the device control command data piece.

The abnormality cause identifying portion 30 may identify the abnormality cause by analyzing at least two of the conversion data pieces converted by the measurement data piece converting portion 30 and also analyzing at least one of the second measurement data piece and the device control command data piece. With this, the abnormality cause which cannot be identified by analyzing the above two or more conversion data pieces can be identified. To be specific, according to this configuration, the number of types of abnormality causes identified can be further increased, and the accuracy of the identification can be improved. At this time, at least one of the second measurement data piece and the control command data piece is associated with the conversion data piece in terms of, for example, the time axis.

The above embodiment describes a case where: the measurement data piece converting portion 30 and the abnormality cause identifying portion 40 are configured as separate devices; and the abnormality cause identifying portion 40 may be configured as artificial intelligence (AI). However, the above embodiment is not limited to this. For example, the measurement data piece converting portion 30 and the abnormality cause identifying portion 40 may be configured as a single device, and this single device may be configured as so-called artificial intelligence (AI).

The above embodiment describes a case where the abnormality cause identifying system 10 identifies the abnormality cause of the device including one rotating member R. However, the above embodiment is not limited to this. To be specific, the abnormality cause identifying system 10 may identify the abnormality cause of the device including two or more rotating members R.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST

10 abnormality cause identifying system
22a, 22b acceleration sensor
24 pickup sensor
26 temperature sensor
30 measurement data piece converting portion
40 abnormality cause identifying portion
R rotating member

The invention claimed is:

1. An abnormality cause identifying system configured to identify an abnormality cause of a device including a rotating member based on a measurement data piece measured during an operation of the device, the abnormality cause identifying system comprising:

a sensor configured to observe a state of the rotating member and acquire the measurement data piece;

a measurement data piece converting portion configured to convert the measurement data piece into two or more new-format conversion data pieces that are different from each other; and an abnormality cause identifying portion configured to identify the abnormality cause of the device by analyzing the new-format conversion data pieces created by the measurement data piece converting portion, wherein the two or more new-format conversion data pieces includes at least two of:

a frequency analysis data piece created so as to include a frequency data piece by showing amplitudes at respective frequencies at a specific time point in an orthogonal coordinate system, a waterfall data piece created so as to include a time data piece in addition to a frequency data piece by arranging and showing amplitudes at respective frequencies within a specific time range, a board data piece created so as to include an amplitude data piece and a phase data piece by showing amplitudes and phases at respective rotational frequencies in an orthogonal coordinate system, a polar data piece created so as to include a phase data piece by showing amplitudes and phases at respective time points in a polar coordinate system, an orbit data piece created so as to include vibration data pieces of two directions by showing a vibration trace formed by continuously arranging, within a specific time range, shaft center positions each determined based on the two vibration data pieces of the two directions, the two vibration data pieces being measured at a same time point, a shaft center trace data piece created so as to include a data piece of a shaft center position in a sliding bearing by showing a trace of shaft center positions at respective time points or respective rotational frequencies within a specific time range in a polar coordinate system, the shaft center positions being vibration centers each determined based on the two vibration data pieces of the two directions, the two vibration data pieces being measured at a same time point, a cascade data piece created so as to include a rotational frequency data piece in addition to a frequency data piece by arranging and showing amplitudes at respective frequencies within a specific rotational frequency range, a camber data piece created so as to include a rotational frequency data piece in addition to a frequency data piece by arranging amplitudes at respective frequencies within a specific rotational frequency range, the camber data piece being shown by a different format from the cascade data piece, and when converting the measurement data piece into the frequency analysis data piece, the waterfall data piece, the board data piece, the cascade data piece, or the camber data piece, the measurement data piece converting portion performs nondimensionalization by using a feature frequency of each data piece.

2. The abnormality cause identifying system according to claim 1, wherein the abnormality cause identifying portion identifies the abnormality cause of the device by analyzing, in combination, at least two of the two or more new-format conversion data pieces created by the measurement data piece converting portion.

3. The abnormality cause identifying system according to claim 1, wherein when converting the measurement data piece into the frequency analysis data piece, the waterfall data piece, the cascade data piece, or the camber data piece, the measurement data piece converting portion creates two or more nondimensionalization data pieces as each data piece by using two or more types of feature frequencies of each data piece, the two or more types of feature frequencies being different from each other.

4. The abnormality cause identifying system according to claim 3, wherein the measurement data piece converting portion labels the nondimensionalization data pieces regarding the types of the feature frequencies used when performing the nondimensionalization.

5. An abnormality cause identifying system configured to identify an abnormality cause of a device including a rotating member based on a measurement data piece measured during an operation of the device, the abnormality cause identifying system comprising:

a sensor configured to observe a state of the rotating member and acquire the measurement data piece;

a measurement data piece converting portion configured to convert the measurement data piece into two or more new-format conversion data pieces that are different from each other; and an abnormality cause identifying portion configured to identify the abnormality cause of the device by analyzing the new-format conversion data pieces created by the measurement data piece converting portion, wherein:

the abnormality cause identifying portion performs the analysis by comparison between the new-format conversion data pieces created by the measurement data piece converting portion and a previously-created determination model; and the determination model is constituted by a plurality of abnormality causes including the abnormality cause, and combination patterns of the new-format conversion data pieces used to identify whether or not each of the abnormality causes is occurring.

6. An abnormality cause identifying system configured to identify an abnormality cause of a device including a rotating member based on a measurement data piece measured during an operation of the device, the abnormality cause identifying system comprising:

a sensor configured to observe a state of the rotating member and acquire the measurement data piece;

a measurement data piece converting portion configured to convert the measurement data piece into two or more new-format conversion data pieces that are different from each other; and an abnormality cause identifying portion configured to identify the abnormality cause of the device by analyzing the new-format conversion data pieces created by the measurement data piece converting portion, wherein:

the measurement data piece includes a first measurement data piece that is converted into the two or more new-format conversion data pieces by the measurement data piece converting portion, and a second measurement data piece that is not converted by the measurement data piece converting portion; and the abnormality cause identifying portion identifies the abnormality cause of the device by adding at least one of the second measurement data piece and a device control command data piece to at least one of the two or more new-format conversion data pieces and performing the analysis, the device control command data piece being a data piece of a control command supplied to the device.

7. An abnormality cause identifying system configured to identify an abnormality cause of a device including a rotating member based on a measurement data piece measured during an operation of the device, the abnormality cause identifying system comprising:

a sensor configured to observe a state of the rotating member and acquire the measurement data piece;

a measurement data piece converting portion configured to convert the measurement data piece into two or more new-format conversion data pieces that are different from each other; and an abnormality cause identifying portion configured to identify the abnormality cause of the device by analyzing the new-format conversion data pieces created by the measurement data piece converting portion, wherein:

the measurement data piece includes
- a first measurement data piece that is converted into the two or more new-format conversion data pieces by the measurement data piece converting portion, and
- a second measurement data piece that is not converted by the measurement data piece converting portion; and the abnormality cause identifying portion identifies the abnormality cause of the device by further analyzing at least one of the second measurement data piece and a device control command data piece that is a data piece of a control command supplied to the device.

8. The abnormality cause identifying system according to claim 5, wherein the abnormality cause identifying portion identifies the abnormality cause of the device by analyzing, in combination, at least two of the two or more new-format conversion data pieces created by the measurement data piece converting portion.

9. The abnormality cause identifying system according to claim 6, wherein the abnormality cause identifying portion identifies the abnormality cause of the device by analyzing, in combination, at least two of the two or more new-format conversion data pieces created by the measurement data piece converting portion.

10. The abnormality cause identifying system according to claim 7, wherein the abnormality cause identifying portion identifies the abnormality cause of the device by analyzing, in combination, at least two of the two or more new-format conversion data pieces created by the measurement data piece converting portion.

* * * * *